United States Patent [19]
Harasaki

[11] Patent Number: 4,652,044
[45] Date of Patent: Mar. 24, 1987

[54] AUTOMOBILE REAR BODY STRUCTURE
[75] Inventor: Hayathugu Harasaki, Hiroshima, Japan
[73] Assignee: Mazda Motor Corporation, Hiroshima, Japan
[21] Appl. No.: 675,562
[22] Filed: Nov. 28, 1984
[30] Foreign Application Priority Data
Nov. 30, 1983 [JP] Japan .............................. 58-185597[U]
Dec. 6, 1983 [JP] Japan .............................. 58-188370[U]
[51] Int. Cl.⁴ ............................................ B62D 23/00
[52] U.S. Cl. .................................... 296/203; 296/188; 296/198; 296/195
[58] Field of Search ............... 296/185, 187, 188, 191, 296/193, 195, 198, 203; 293/126

[56] References Cited
U.S. PATENT DOCUMENTS

| | | | |
|---|---|---|---|
| 2,115,903 | 5/1938 | Breer et al. | 296/185 |
| 2,814,524 | 11/1957 | Porsche et al. | 296/191 |
| 3,423,123 | 1/1969 | Wessells, III | 296/185 |
| 3,661,419 | 5/1972 | Mitamura et al. | 296/195 |
| 3,697,124 | 10/1972 | Wessells | 296/185 |
| 4,401,332 | 8/1983 | Kimura et al. | 293/135 |

FOREIGN PATENT DOCUMENTS 57-74881 5/1982 Japan .
57-83078 5/1982 Japan .
981937 1/1965 United Kingdom ................ 293/126

Primary Examiner—Robert B. Reeves
Assistant Examiner—Dennis H. Pedder
Attorney, Agent, or Firm—Fleit, Jacobson, Cohn & Price

[57] ABSTRACT

An automobile rear body structure including a rear fender panel extending substantially longitudinally along each side of the body structure, a rear end panel extending substantially transversely along a rear end portion of the body structure, a rear floor panel, a tire house assembly comprising a tire house outer panel having an arcuately curved portion and a tire house inner panel having an arcuately curved portion which is welded to the arcuately curved portion of the tire house outer panel. The tire house outer panel has a side portion welded to the rear fender panel and provided with a rearwardly extended portion which is welded to the rear end panel. The tire house inner panel has a lower portion welded to the rear floor panel and is provided at a rear portion with a substantially vertical wall which has a rear end welded to the rear end panel to provide a rigid structure.

A closed cross section section structure extends from the tire house to the rear end panel to provide increased rigidity.

4 Claims, 7 Drawing Figures

AUTOMOBILE REAR BODY STRUCTURE

BACKGROUND OF THE INVENTION

1. Field of the Invention

The present invention relates to an automobile rear body structure and more particularly to an automobile rear side body structure. More specifically, the present invention pertains to an automobile rear body structure including a tire house structure secured to a body rear fender panel and a rear floor panel.

2. Description of the Prior Art

Conventionally, an automobile rear body structure includes a tire house structure located at each side. The tire house is constituted by a tire house inner panel and a tire house outer panel both of which are of arcuately curved configuration and welded together to form a curved housing for accommodating an upper portion of the rear wheel. The tire house outer panel is welded at its side portion to a rear fender, and the tire house inner and outer panels are welded at the rear lower end portions to the rear floor panel. It has been experienced in this type of rear body structure that sufficient rigidity cannot be provided and deformations have later been produced in use.

In Japanese utility model application 55-160988 filed on Nov. 10, 1980 and disclosed for public inspection on May 22, 1982, under the disclosure number 57-83078, it is proposed to extend the tire house outer panel rearward and connect the opposite sides of the extended portion to the rear fender and the rear floor panel, respectively. However, this proposal is aimed to make it unnessary to extend the rear portion of the floor panel sideward, so that it is not effective at all to provide the structure with increased rigidity.

In a hatch-back type automobile body structure, a proposal has been made is Japanese Utility model application No. 55-133187 filed on Oct. 27, 1980 and disclosed for public inspection on May 8, 1982, under the disclosure number 57-74881, to extend the rear pillar inner panel downward and connect it to the rear quarter outer panel and the rear cross member and form a transversely extending structure of a closed cross-section by the rear pillar inner panel and the rear cross member. The proposed structure is, however, disadvantageous in that any external load from the rear bumper is applied to the rear quater outer panel causing deformation thereof.

OBJECT OF THE INVENTION

It is therefore an object of the present invention to provide automobile rear body structure which has an increased rigidity and strength.

Another object of the present invention is to provide an automobile rear body structure having a tire house welded not only to the rear fender panel and the rear floor panel but also to the rear end panel.

SUMMARY OF THE INVENTION

According to the present invention, the above and other objects can be accomplished by an automobile rear body structure including a rear fender panel extending substantially longitudinally along each side of the body structure, a rear end panel extending substantially transversely along a rear end portion of the body structure, a rear floor panel, a tire house assembly comprising a tire house outer panel having an arcuately curved portion and a tire house inner panel having an arcuately curved portion which is secured to the arcuately curved portion of the tire house outer panel, said tire house outer panel having a side portion secured to the rear fender panel and provided with a rearwardly extended portion which is secured to the rear end panel, said tire house inner panel having a lower portion secured to the rear floor panel and being provided at a rear portion with a substantially vertical wall which has a rear end secured to the rear end panel. The rear end panel may comprise a rear end lower panel and a rear end upper panel which is secured to the lower panel and extends forward from an upper edge of the lower panel, the upper panel having a transverse outer end secured to the vertical wall of the tire house inner panel. The rear end upper panel may further be secured to the arcuately curved portion of the tire house inner panel. Between the rear end upper panel and the rear floor panel there may be provided a gusset which has an upper edge secured to the rear end upper panel and a lower edge secured to the rear floor panel.

According to the features of the present invention, the tire house outer panel is secured not only to the rear fender panel but also to the rear end panel. Further, the tire house inner panel is formed at the rear portion with the substantially vertical wall which is secured to the rear end panel. The above features effectively increase the strength and the rigidity of the rear body structure.

DESCRIPTION OF THE PREFERRED EMBODIMENT

Figure 1:
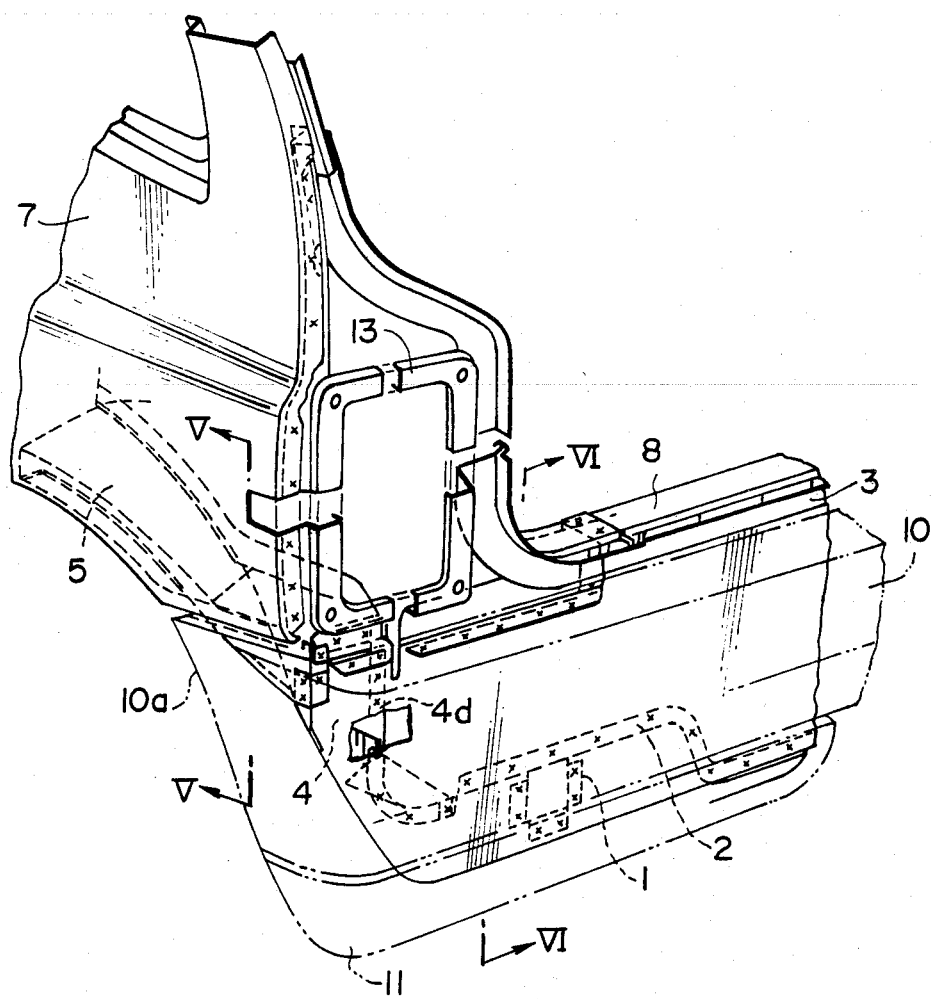
FIG. 1 is a fragmentary perspective view of an automobile rear body structure embodying the features of the present invention.
Figure 5:
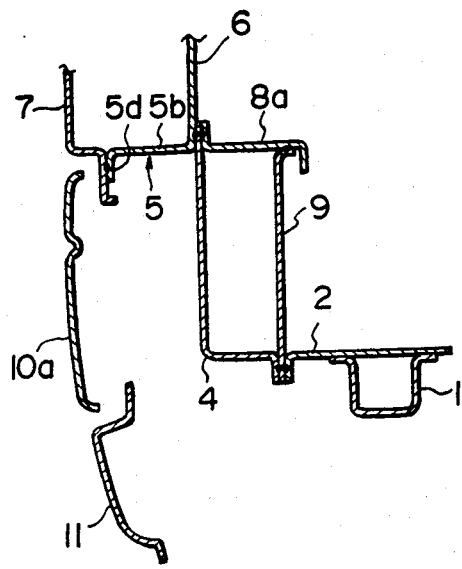
FIG. 5 is a sectional view taken substantially along the line V—V in FIG. 1.
Figure 6:
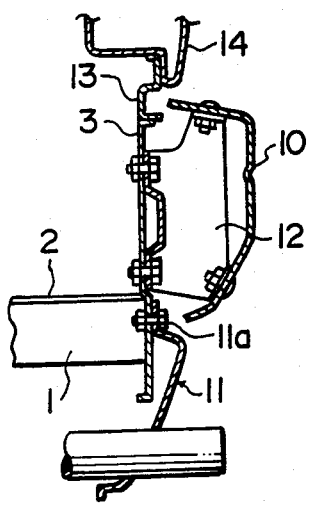
FIG. 6 is a sectional view taken substantially along the line VI—VI in FIG. 1; and, FIG. 7 is a fragmentary perspective view of the left hand rear end corner portion of the body structure.
Figure 7:
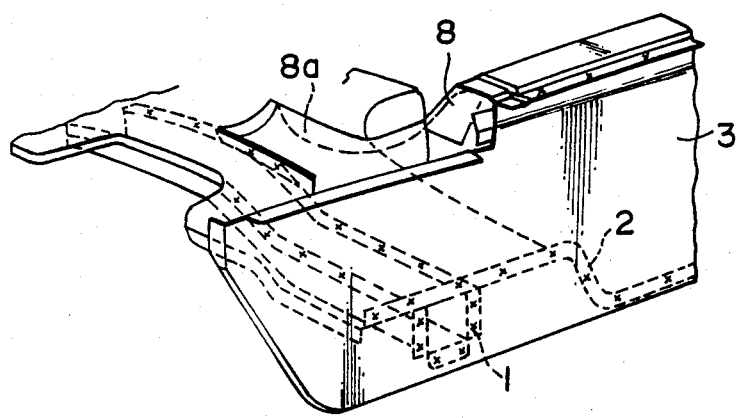

Referring to the drawings, particularly to FIGS. 1 and 5 through 7, the automobile rear body structure shown therein includes a longitudinally extending rear frame 1 of a channel shaped cross-section at each side of the body. A rear floor panel 2 extends over the rear frame 1 and is secured thereto by, for example, spot welding. At the rear end of the body, there is provided a substantially vertical rear end lower panel 3 which extends transversely of the body. As shown in FIGS. 1 and 7, the rear frame 1 and the rear floor panel 2 are welded at the rear ends to the panel 3. The body structure further includes a rear fender panel 7 extending along each side of the body. There is also provided a tire house assembly comprised of a tire house inner panel 4 and a tire house outer panel 5. The tire house inner panel 4 has an arcuately curved portion 4a and a substantially vertical inner wall 4b. The tire house outer panel 5 has an arcuately curved portion 5a and is welded to the tire house inner panel 4 so that the arcuately curved portions 4a and 5a are substantially aligned with each other. The tire house outer panel 5 is formed integrally with a vertically extending wall 6 which forms a quarter panel.

Figure 4:
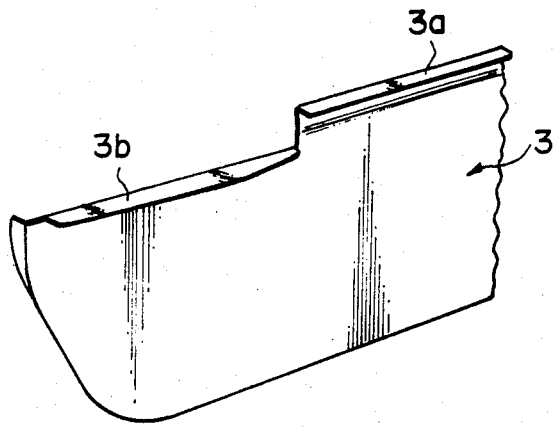
FIG. 4 is a fragmentary perspective view of the rear end panel.

Referring to FIG. 4, it will be noted that the rear end lower panel 3 is formed at the intermediate portion of the upper edge with a center flange 3a. At the outer end portion, the upper edge of the rear end lower panel 3 is stepped down and formed with a flange 3b which is connected with the lower flange of a lamp house 13. A rear end upper panel 8 is welded to the flanges 3a and 3b of the rear end lower panel 3 to define a rear trunk opening. The tire house outer panel 5 is formed at the rear end portion with a substantially horizontal rear extension 5b of which the rear end is formed with a flange 5c welded to the rear end lower panel 3. Along the outer side periphery, the tire house outer panel 5 is formed with a flange 5d by which the panel 5 is welded to the rear fender panel 7 at a level higher than the rear floor panel 2 as shown in FIG. 5.

Figure 2:
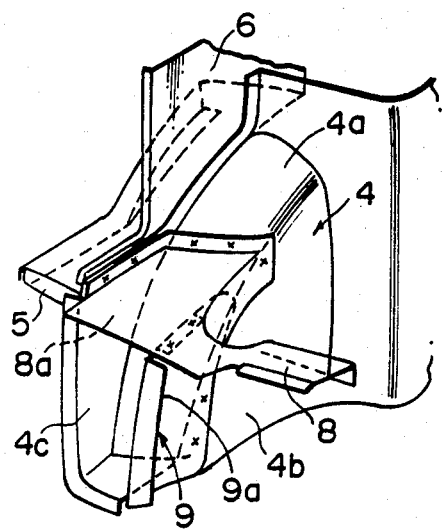
FIG. 2 is a fragmentary perspective view of a tire house assembly as seen from the inside of the body.
Figure 3:
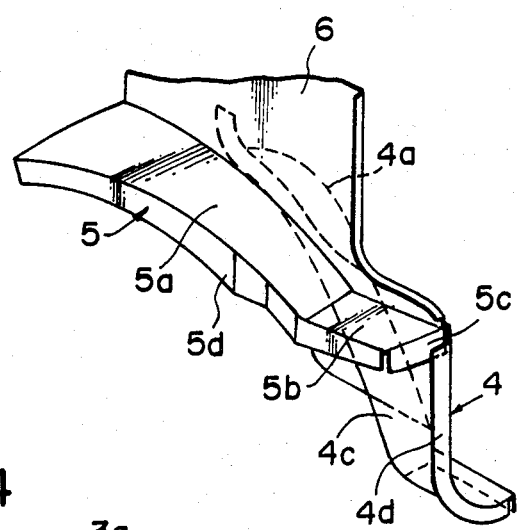
FIG. 3 is a fragmentary perspective view of the tire house assembly as seen from the outside of the body.

The tire house inner panel 4 is formed at the rear portion with a rearwardly extending vertical wall 4c having a rear end formed with a substantially vertically extending flange 4d which is welded to the rear end lower panel 3. The rear end upper panel 8 is provided at each end with a stepped down portion 8a which has a rear edge welded to the flange 3b of the rear end lower panel 3. As shown in FIG. 2, the stepped down portion 8a is forwardly extended and welded at the forward end to the arcuately curved portion 4a and the inner wall 4b of the tire house inner panel 4. Further, the transverse outer end of the stepped down portion 8a is welded to the upper edge of vertical wall 4c of the tire house inner panel 4 and to the vertical wall 6 on of the tire house outer panel 5.

In FIG. 5, it will be noted that the horizontal rear extension 5b of the tire house outer panel 5 is at the same level as the stepped down portion 8a of the rear end upper panel 8, which is located above the rear floor panel 2. A vertical gusset 9 is provided between the stepped down portion 8a of the rear end upper panel 8 and the floor panel 2. The gusset 9 is welded at the upper edge to the stepped down portion 8a. The lower edge of the gusset 9 is held between and welded to the lower edge of the tire house inner panel 4 and the rear floor panel 2. Thus a structure of closed cross-section is formed by the tire house inner panel 4, the stepped down portion 8a of the rear end upper panel 8 and the gusset 9. The gusset 9 has a rear edge formed with a flange 9a which is welded to the rear end lower panel 3.

As shown in FIG. 1, a rear bumper 10 is provided rearward of the rear end lower panel 3. The rear bumper 10 is supported through a suitable number, usually two, of bumper stays 12 secured to and extending rearwardly from the rear end lower panel 3. Further, as shown in FIG. 6, a rear skirt 11 is secured by means of bolts 11a to the lower portion of the rear end lower panel 3. In the illustrated embodiment, the rear bumper 10 is bent forward at each transverse outer end portion a shown by 10a in FIG. 1. The rear skirt 11 is also bent forward at each transverse outer end. From the viewpoint of appearance, the forwardly bent portion 10a of the rear bumper 10 is formed so that it makes a substantially continuous contour with the rear fender panel 7 and the forwardly bent portion of the rear skirt 11.

As shown in FIG. 6, the lamp house 13 carries a rear combination lamp 14.

The invention has thus been shown and described with reference to a specific embodiment. However, it should be noted that the invention is in no way limited to the details of the illustrated structure, but changes and modifications may be made without departing from the scope of the appended claims.

I claim:

1. An automobile rear body structure including a rear fender panel extending substantially longitudinally along a side of the body structure, a rear end panel extending substantially transversely along a rear end portion of the body structure, a rear floor panel, a tire house assembly comprising a tire house outer panel having an arcuately curved portion and a tire house inner panel having an arcuately curved portion which is secured to the arcuately curved portion of the tire house outer panel, said tire house outer panel having a side portion secured to the rear fender panel and provided with a rearwardly extended portion which is secured to the rear end panel, said tire house inner panel having a lower portion secured to the rear floor panel and being provided at a rear portion with a substantially vertical wall which has a rear end secured to the rear end panel, said rear end panel including a rear end lower panel extending substantially vertically across the rear floor panel and having an upper edge, and a rear end upper panel which is secured to the rear end lower panel and extends forward from the upper edge of the rear end lower panel, the rear end upper panel having a transverse outer end secured to the vertical wall of the tire house inner panel, said rear end upper panel being formed at a transverse end portion with a forward extension which extends in a substantially horizontal plane and is secured to the arcuately curved portion of the tire house inner panel, a substantially vertically extending gusset being provided between the forward extension of the rear end upper panel and the rear floor panel, said gusset being secured to said forward extension of the rear end upper panel, to the rear floor panel and to the tire house inner panel so that a structure of closed vertical cross section extending transversely of the body structure is formed by the gusset, by the forward extension of the rear end upper panel and by the tire house inner panel.

2. A body structure in accordance with claim 1 in which said tire house outer panel is secured at a rear portion to a lower edge portion of the rear fender panel at a level higher than the rear floor panel.

3. A body structure in accordance with claim 1 which further includes a rear bumper located rearward of the rear end panel and supported by the rear end panel, said rear bumper having a forwardly bent portion at a transverse outer end, said forwardly bend portion forming a substantially continuous contour with the rear fender panel.

4. A body structure in accordance with claim 3 which further includes a rear skirt extending downwardly from the rear end panel and having a forwardly bend portion at a transverse outer end, said forwardly bent portion on the rear skirt forming a substantially continuous contour with the forwardly bend portion of the rear bumper.

* * * * *